(12) United States Patent
Kellgren

(10) Patent No.: US 8,017,087 B1  
(45) Date of Patent: Sep. 13, 2011

(54) DEVICE FOR OXYGENATING GROUND WATER

(75) Inventor: Jerry Kellgren, Aurora, IL (US)

(73) Assignee: OxyGreen Corporation

( * ) Notice: Subject to any disclaimer, the term of this patent is extended or adjusted under 35 U.S.C. 154(b) by 529 days.

(21) Appl. No.: 12/212,810

(22) Filed: Sep. 18, 2008

(51) Int. Cl.  
*C02F 1/461* (2006.01)

(52) U.S. Cl. ............. 422/186.04; 210/748.01; 205/701; 204/274; 422/22

(58) Field of Classification Search ............. 422/22, 422/186, 186.04; 210/748.01; 205/701, 205/742, 756; 204/274, 275.1, 276, 278  
See application file for complete search history.

(56) References Cited

U.S. PATENT DOCUMENTS

| 6,102,623 A | 8/2000 | Suthersan |
| 6,110,353 A | 8/2000 | Hough |
| 6,758,959 B2 | 7/2004 | Kellgren |

FOREIGN PATENT DOCUMENTS

WO    WO 9521795 A1    8/1995

*Primary Examiner* — Walter D Griffin  
*Assistant Examiner* — Cameron J Allen  
(74) *Attorney, Agent, or Firm* — Robert L. Marsh

(57) ABSTRACT

An oxygenation device consists of a first vertically oriented tube having electrically conductive plates for forming oxygen by electrolysis. Above the plates is a pump formed by a second length of tube fitted within the first tube with a spacing between the walls of the first and second lengths of tubing thereby forming a cavity. Compressed air is admitted into the cavity. The second length of tubing has an open lower end for receiving air from the cavity. Air enters the second tube in belches that form large bubbles.

11 Claims, 4 Drawing Sheets

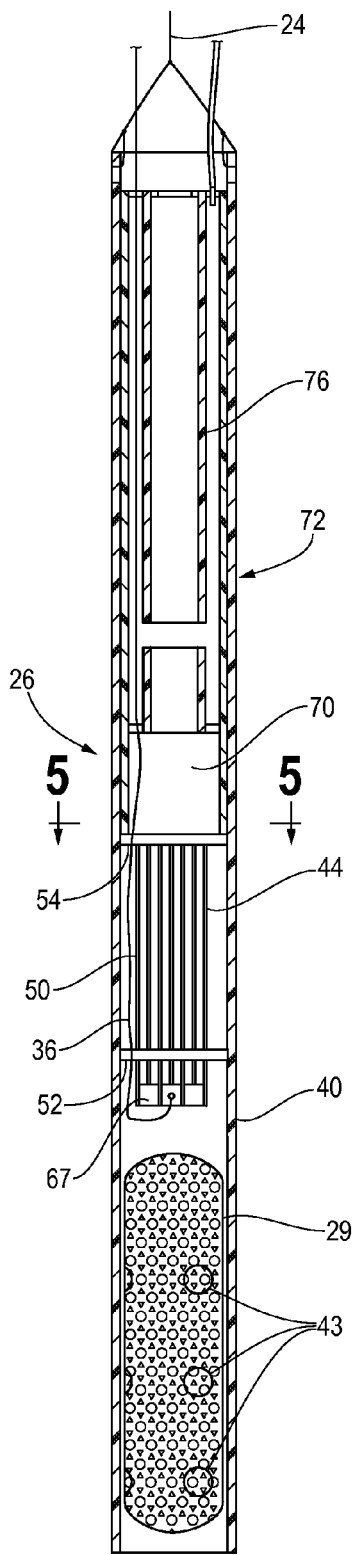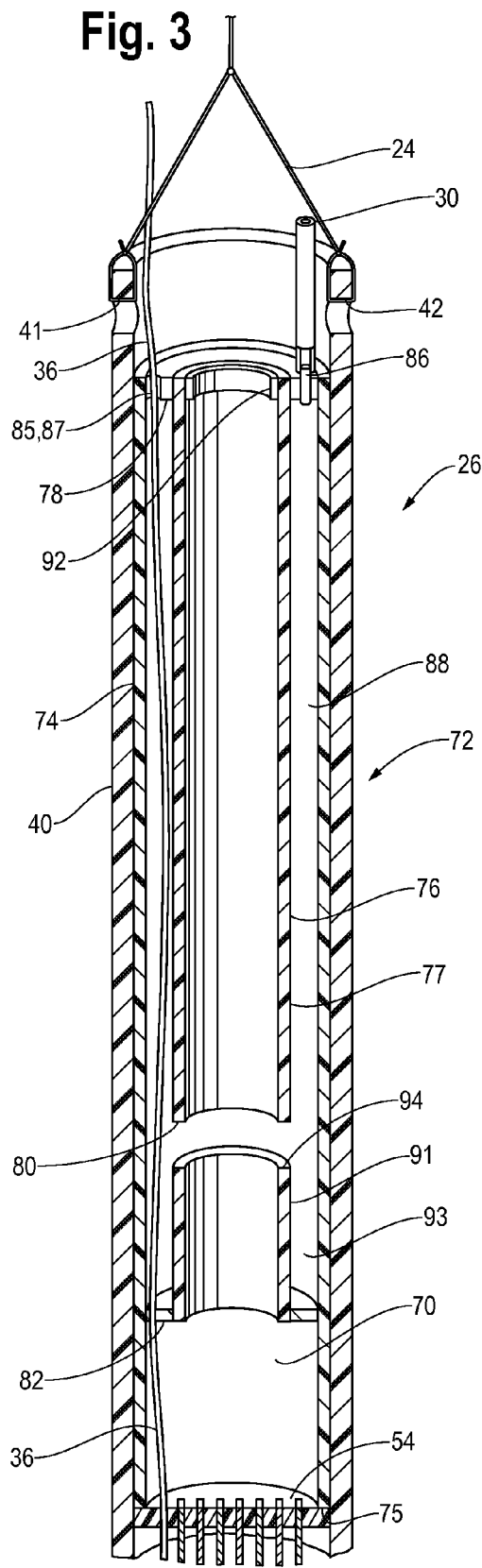

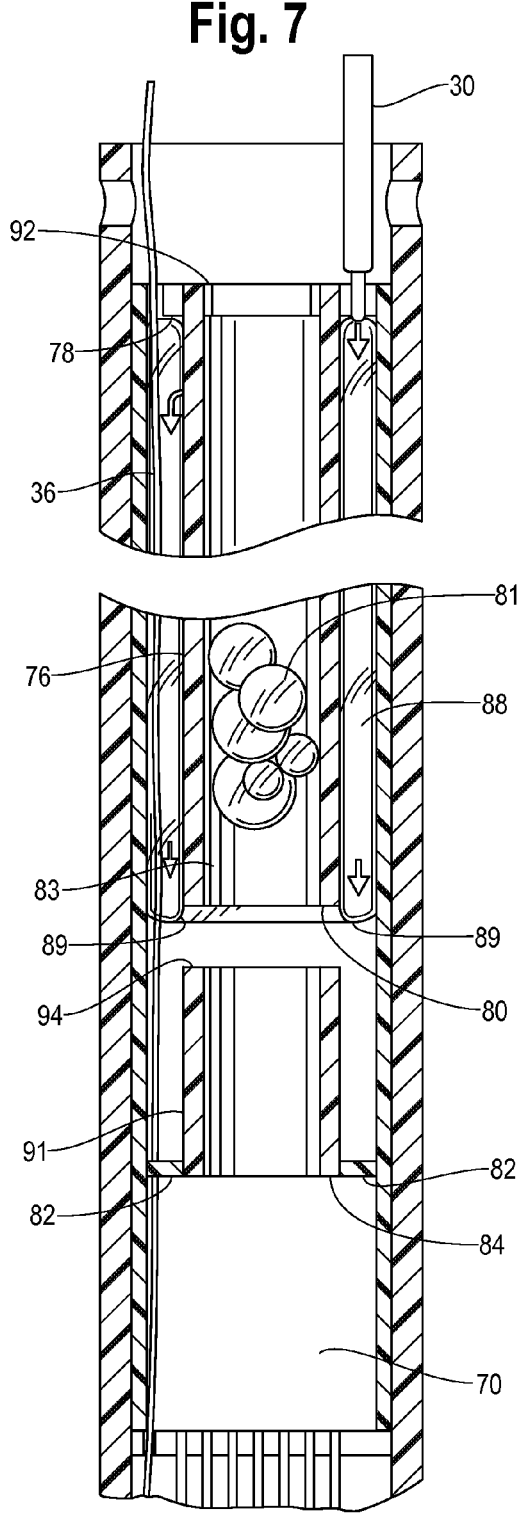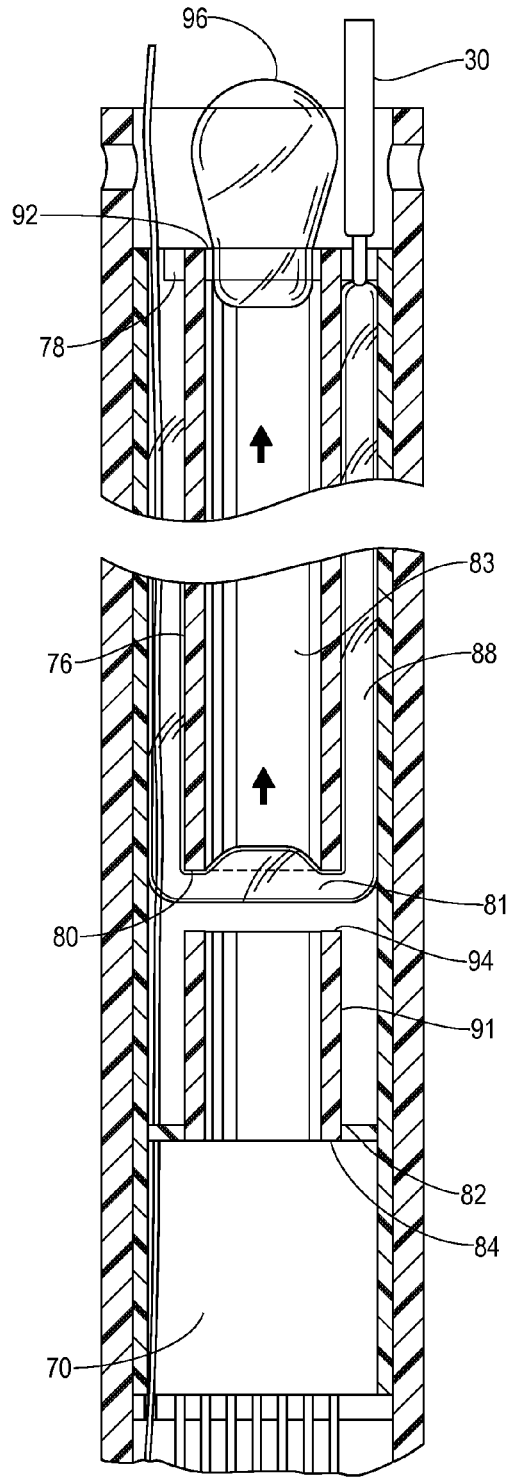

DEVICE FOR OXYGENATING GROUND WATER

The present invention is a device for removing ascorbic pollutants from the ground, and in particular to an apparatus for removing such pollutants by oxygenating ground water.

BACKGROUND OF THE INVENTION

When hydrocarbons, such as oil, gasoline and the like, leach into surrounding land they permeate the ground into which they are spilled thereby damaging the environment. The toxic waste from such spills can prevent the owner thereof from obtaining a building permit leading to development of the land and may cause existing activities to be shut down, rendering the parcel of land unmarketable or unusable. One method of removing hydrocarbon pollutants from the ground is to encourage the growth of bacteria within the ground that feed on the toxic hydrocarbon molecules to thereby convert them into nontoxic waste products. Another method is to oxygenate the ground to thereby encourage the oxygenation of the toxic hydrocarbon molecules and convert them to nontoxic molecules.

Soil contamination arises as a result of leakage of oil and fuel tanks, the associated piping, or as a result of the process of filling and emptying such tanks. The hydrocarbons contaminate the unsaturated soil as a result of gravity and of the movement of surface water which causes contamination to spread over an area significantly greater than occupied by the tanks alone. Over time the petroleum products will leach into underlying ground spreading horizontally and vertically through the pores of the soil. Upon reaching ground water, the petroleum will pool and move with the ground water to contaminate adjacent ground.

The primary pollutants from gasoline and the like are benzene, toluene, ethylbenzene, xylene (BTEX), and methyltertiary-butyl-ether (MTBE).

In my preceding U.S. Pat. No. 6,758,959 B2 I disclosed a device for oxygenating underground water using an oxygenation unit that is lowered into a vertically drilled well the use of which is described in detail in U.S. Pat. No. 6,758,859 B2 which is incorporated herein by reference. Preferably, a plurality of such devices is employed with each device lowered into a separate well that extends below the water table. The oxygenation unit consists of a length of tubing having an upper and lower end with the tubing wall extending between them. Within the tubing is a plurality of parallel electrically conductive plates extending parallel to each other and parallel to the axis of the tubing. The plates are spaced from one another and an electric potential is applied across adjacent plates such that electrolysis will break down water between the plates into their chemical components, namely $O_2$ and $H_2$. Water moves across the plates by means of a pump that issues air bubbles into the neck of an inverted funnel. The bubbles of air move through the neck of the funnel and upward through the well causing upward movement of the surrounding water thereby drawing new water from the surrounding ground below the oxygenation unit.

While the device disclosed in my previous patent improves the oxygenation of the underground water, it has been found that some of the oxygen inserted into the water by virtue of the plates becomes stripped from the water by the bubbles that are emitted from the aperture of the inverted funnel. Consequently, a significant portion of the oxygen inserted into the water by the plates becomes collected in the bubbles and is released at the surface, thereby reducing the effectiveness of the device. It would be desirable, therefore, to provide and improved pump for the oxygenation unit that will reduce the amount of oxygen stripped from the water being circulated.

SUMMARY OF THE INVENTION

Briefly, the present invention is embodied in an oxygenation device for increasing the oxygenation of ground water. To oxygenate ground water within a parcel of land, a plurality of wells are drilled into the ground, the wells being spaced sufficiently close to one another to oxygenate the intervening ground. Preferably, twenty to twenty-five feet should separate adjacent wells. Each of the wells must extend below the water table, the deeper the well extends below the water table the greater area surrounding the well that can be oxygenated. To oxygenate each well, an oxygenation unit is lowered therein.

I have found that a pump for an oxygenation device that has an inverted funnel with a relatively small diameter aperture through which bubbles are released, as disclosed in my U.S. Pat. No. 6,758,959 B2 forms bubbles having a very small diameter. As a consequence of the bubbles being relatively small in size, the bubbles are numerous and generate the froth of water and air that is readily observed rising above the ground level within each of the wells fitted with an oxygenating device in accordance with U.S. Pat. No. 6,758,959 B2.

The oxygen released by the electrolysis between adjacent plates enters the water that moves between the plates and some of the oxygen is stripped out of the water as a result of encountering one of the numerous bubbles created by the air passing through the narrow neck of the inverted funnel. Oxygen is transferred from the water to the bubbles when the water containing oxygen contacts the surface of a bubble of air. Reducing the amount of bubble surface area that is in contact with water will therefore reduce the amount of oxygen stripping that occurs as the bubbles draw water up the well. It is the underlying purpose, therefore, of the present invention to provide an airflow daft pump that generates larger bubbles.

The device of the present invention includes a length of tubing having an open upper end and an open lower end with a tubular wall extending from the upper end to the lower end, a longitudinal axis and an inner diameter. The device also includes a plurality of parallel electrically conductive plates within the tubular wall. Alternate ones of the electrically conductive plates are connectable to positive and negative terminals of a source of electric power such that adjacent ones of the electrically conductive plates bear opposite charges. The oppositely charged adjacent plates will break the surrounding water into its chemical components of oxygen and hydrogen by electrolysis and water moving across the surface of the plates will absorb the oxygen molecules that form on the plates.

Positioned above the plates is an improved airflow draft pump that includes a second length of tubing having an outer diameter less than the inner diameter of the first length of tubing and a longitudinal axis parallel to the longitudinal axis of the first length of tubing. The second length of tubing is fitted within the first length of tubing and above the plurality of electrically conductive plates. The lower end of the second length of tubing is left open with the lower end forming a plane perpendicular to the longitudinal axis thereof. Also, the chamber is formed by the space between the outer diameter of the second tubing and the inner diameter of the first tubing and air forced into the chamber through a tube from an above ground compressor. The chamber acts as a staging chamber and allows the volume of air therein to be pumped around the lower end of the second tube and into the second tube in large belches rather than in a continuous stream of smaller bubbles.

I have also found that it is desirable to provide a mixing chamber above the plates and below the second length of tubing in which the oxygen is allowed to become uniformly absorbed by the water before entering the second length of tube and become exposed to the bubbles of air.

In another embodiment of the invention, the upper end of the second length of tube has an inner back pressure ring for constricting the inner diameter thereof. Preferably, the constriction defines a circular opening of about one inch in diameter. The surface tension of water will cause the air released through the restricted aperture to coalesce into relatively large bubbles. The constriction therefore aids in the shaping of individual large bubbles as opposed to permitting released air to randomly form bubbles of different sizes.

BRIEF DESCRIPTION OF THE DRAWINGS

A better and more complete understanding of the invention will be had after a reading of the following detailed description taken in conjunction with the drawings wherein:

FIG. 2 is an enlarged cross-sectional view of one of the oxygenating devices shown in FIG. 1;

FIG. 3 is a fragmentary further enlarged cross-sectional view of the oxygenating device shown in FIG. 2;

FIG. 7 is a fragmentary further enlarged cross-sectional view of the oxygenation device shown in FIG. 2 depicting the formation of an annular surface tension dam; and FIG. 8 is another further enlarged fragmentary cross-sectional view of the device shown in FIG. 2 depicting the movement of air from the dam shown in FIG. 7 into the inner tubular member.

DETAILED DESCRIPTION OF PREFERRED EMBODIMENT

Figure 1:
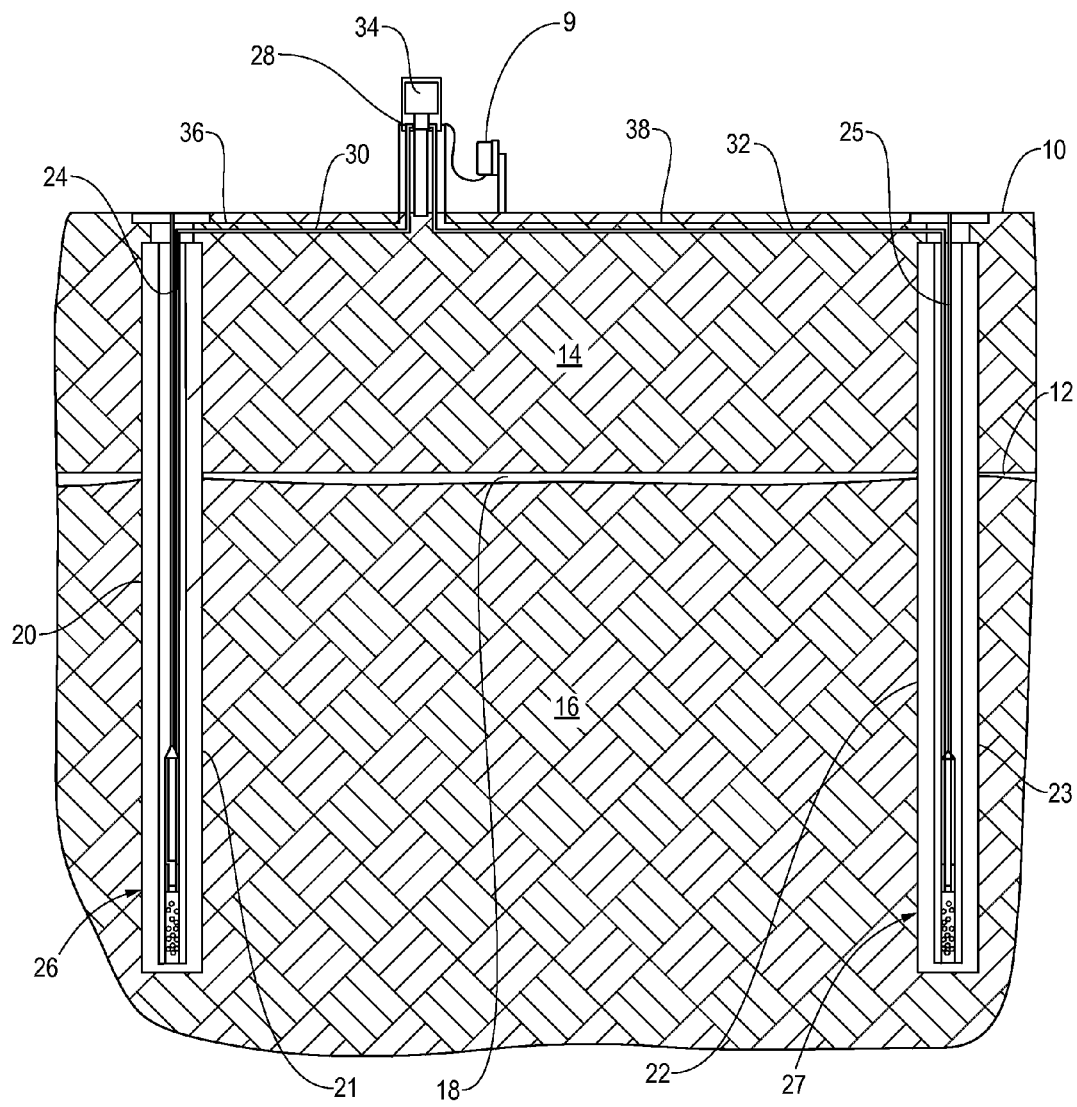
FIG. 1 is a cross-sectional view of a parcel of ground having a plurality of wells therein fitted with an oxygenation device in accordance with the present invention.

Referring to FIG. 1, a parcel of ground has a surface 10 and a ground water level 12. Above the ground water level 12 is unsaturated soil 14 and below the ground water level is saturated soil 16 containing a mixture of liquid hydrocarbon pollutants and water. A layer of pooled hydrocarbons 18, such as gasoline or oil, float on the surface of the ground water level 12.

To detoxify the ground 12, 14, the concentration of oxygen in the ground water is increased to support the growth of bacteria needed to break down the toxic chemicals. To increase the oxygen in the underground water level 12, a plurality of wells 20, 22 are drilled into the ground 14, 16 to a level that is below the ground water level 12. Deeper wells 20, 22 will generally result in a larger area oxygenated by each of the wells 20, 22. Suspended within each of the wells 20, 22 by wires 24, 25 are oxygenation units 26, 27 in accordance with the present invention. Positioned above the ground level 10 is an air compressor 28 that forces air through tubes 30, 32 that extend into the wells 20, 22 respectively and are connected to each of the associated oxygenation units 26, 27. Also provided above ground level 12 is a source of electric power 34 which may be in the form of a transformer, not shown, for reducing the voltage of commercially available AC power to a suitable level for connection to the parallel plates described below. Alternately, batteries may be provided depending upon the economics of providing the required electric power. The wires 36, 38 extend from the power source 34 down the wells 20, 22 and are connected to the oxygenating units 26, 27.

Referring to FIG. 2 in which the elements of oxygenating unit 26 is representative of all, the unit 26 is enclosed in an elongate tubular member 40 which may be made out of any suitable material such as plastic. In the preferred embodiment, the tubular member 40 has an overall length of about four feet and a diameter of about three inches. A pair of diametrically spaced apart holes 41, 42 in the walls of the upper end of the tubular member 40 permit the attachment of a support wire 24 for suspending the unit 26 at the desired depth below the water level 12. The lower end of the tubular member 40 has a plurality of apertures 43 therein for allowing water to freely enter at the lower end thereof. A flexible porous nylon sock 29 containing granulated activated carbon or an ion exchange material for removing various impurities such as a chloride producing salt.

Figure 5:
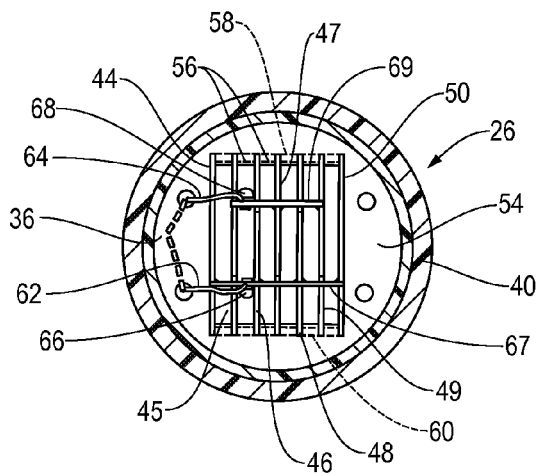
FIG. 5 is a top view of the upper end spacer for the oxygenation device shown in FIG. 2 taken through line 5-5 thereof.
Figure 4:
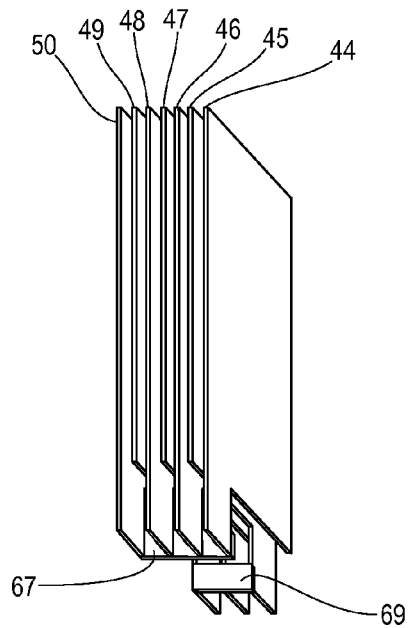
FIG. 4 is an isometric view of the plates for the device shown in FIG. 2.

Referring to FIGS. 2, 4, and 5, positioned above the sock 29 are a plurality of vertically oriented parallel electrically conductive plates 44-50 which are retained in spaced relationship within the tubular member 40 by upper and lower insulating jimson spacers 52, 54. As best shown in FIG. 5, each jimson spacer, of which spacer 54 is representative of both, has a circular outer diameter equal to the inner diameter of the tubular member 40 and forms a barrier between the outermost plates 44, 50 and the inner surface of the tubular member 40 such that all the water moving upwards from the lower end 51 of the tubular member 40 must pass between two of the plates 44-50. As shown in FIG. 5, the plates 44-50 are retained in spaced relationship by a plurality of fingers 56, each of which extends between two adjacent plates. The plates 40-50 have a thickness of about one-sixteenth inch and the spacings between plates are about three-sixteenth inch. A pair of non-conductive end members 58, 60 (shown in broken lines in FIG. 5) abut the opposite vertical ends of the plates 44-50 and seal against the lower surface of the upper jimson spacer 54 and the upper surface of the lower jimson spacer 52 such that water moving from below the plates upward between them will move in a laminar flow and not circulate between plates or between the inner wall of the tubular member 40 and one of the outermost plates 44, 50.

As best shown in FIGS. 4 and 5, the electric cable 36 includes positive and negative wires 62, 64 respectively, with the positive wire 62 attached by connector 66 to a shunt 67 which electrically connects together all the negatively charged plates 44, 46, 48, and 50. Similarly, negative wire 64 is attached by a connector 68 to a second shunt 69 which connects together all the positively charged plates 45, 47, and 49.

As shown in FIGS. 2 and 3, positioned above the upper plate retainer 54 is a mixing chamber 70 having a vertical length of at least three inches for permitting the oxygen $O_2$ absorbed by the surrounding water to become uniformly absorbed therein and thereby reduce the stripping of the oxygen as the water rises through the tube 40. Positioned above the mixing chamber 70 is the airflow draft pump 72 which occupies the upper half of the tube 40.

As best shown in FIG. 3, the airflow draft pump 72 includes a tubular liner 74, the outer diameter of which is substantially equal to the inner diameter of the first tubular member 40 and the overall length of which is approximately one-half the overall length of the first tubular member 40. The tubular liner 74 is fitted within the first tubular member 40 at a position immediately below the spaced apart holes 41, 42 with the lower end 75 thereof abutting against the upper surface of the upper jimson spacer 54.

Extending coaxially through the central opening of the tubular member 40 and the liner 74 is a second tubular member 76 having an outer surface with a diameter at least an inch smaller than the inner diameter of the tubular liner 74. The second tubular member 76 is retained in coaxial relationship with tubular member 40 by an annular upper end plate 78 having a circular outer circumference that is bonded to the upper end of the second tubular liner 76 and a circular central aperture 79 that receives the upper end of, and is bonded to, the tubular member 76. The lower end 80 of the tubular member 76 remains open and defines a plane perpendicular to the axial length of the coaxial tubular members 40, 76. The lower end 80 may be retained in coaxial relationship with the liner 74 and first tubular member 40 by means of a plurality of radially extending longitudinal ribs, one of which 77 is shown only in FIG. 3.

Figure 6:
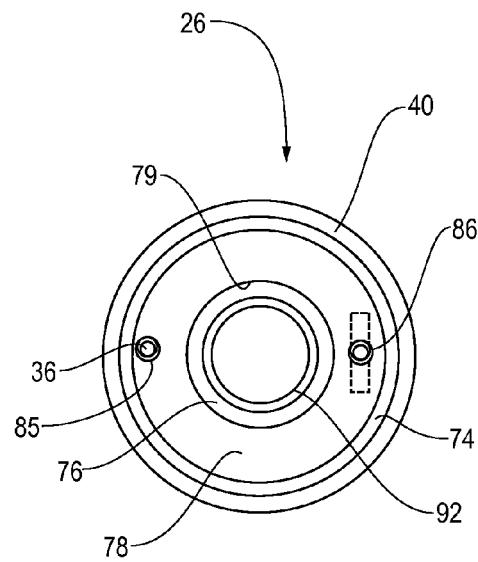
FIG. 6 is a top view of the device shown in FIG. 2 showing the upper end plate thereof.

As best shown in FIGS. 3 and 6, the annular end plate 78 also has an aperture 84 therein spaced midway between the central opening 79 and the outer circumference thereof, and fitting into the upper surface of the aperture 84 is a compressed air inlet fitting 86 to which the distal end of the tubes 30 leading from the compressor 28 is attached. Air from the compressor 28 will therefore be forced through the tube 30, the fitting 86, and the aperture 84 and into an expansion chamber 88 defined by the outer surface of the second tubular member 76 and the inner surface of the tubular liner 74. The electric power cable 36 that connects to the plates 44-50 extends through another aperture 85 in the upper end plate 78 and a seal 87 seals the space surrounding the cable 36 in the aperture 85 to prevent leakage of air from the expansion chamber 88. The cable 36 extends downward between the first and second tubular members 40, 76 and the wires therein connect to the shunts 67, 69 as described above.

Referring to FIG. 3, fitted within the tubular liner 74 and spaced at least five or six inches above the upper jimson spacer 54 is a second annular spacer member 82 having an outer diameter sized to fit within and the tubular liner 74 where it is bonded in place by a suitable adhesive. The second annular spacer 82 has a circular central opening 84 equal in diameter to that of the outer surface of the second tubular member 76. Extending axially upward from the central opening 84 of the second spacer 82 is a third tubular member 91 having inner and outer dimensions equal to the second tubular member 76 and coaxial thereto. The upper end 94 of the third tubular member 91 is open and is spaced from the lower end 80 of the second tubular member 76 by a distance of at least one inch to thus permit unobstructed flow of air from the expansion chamber 78 into the central opening of the second tubular member 76. The provision of the second annular spacer 82 forms the mixing chamber 70. Accordingly, oxygen absorbed into water that rises through the plates 44-50 will become uniformly absorbed into the surrounding water in the mixing chamber 70 before encountering the aperture formed at the lower end 80 of the tubular member 76. The third tubular member 91 spaces the mixing chamber 70 from the bubble forming process at the lower end 80 of the second tubular member 76. The spacing between the outer circumference of the third tubular member 91 and the inner surface of the tubular liner 74 also provides a chamber 95 for receiving excess expansion air which assists in permitting the formation of uniform bubbles within the central opening of the second tubular member 76.

Positioned at the upper end of the second tubular member 76 is a annular radially inwardly directed back pressure ring 92 that restricts the circumference of the opening of the upper end of the second tubular member 76. Preferably, the inner diameter of the back pressure ring 92 is about one inch.

Referring to FIG. 7, compressed air from the tube 30 is forced downwardly around the circumference of the second tubular member 76 until it reaches the lower end 80. As air continues to enter the expansion chamber 88, the surface tension of the water will form an annular dam 89 around the lower end 80 of the second tubular member 76. Referring to FIG. 8, as air continues to enter the cavity 88, the buoyancy of the air will overcome the surface tension of the dam 89 and a large volume of air 81 will flow under the lower end 80 of the second tubular member. It should be appreciated that by configuring the lower end 80 of tubular member 76 as a plane that extends parallel to the horizon, the air 81 overcomes the dam 89 and enters the tubular member 76 across the entire circumference of tubular member 76 thereby assuring that a maximum amount of air enters tubular member 76 at any one time. Referring to both FIGS. 7 and 8, after the volume of air 81 enters the central opening of member 76, it will rise as a turbulent mass of water and air to the upper end of tubular member 76 followed by a volume of water 83. In the meantime, more air entering the expansion chamber 88 will begin to form a new water dam 89. Compressed air will therefore enter the central opening of the second tubular member 76 in a series of large belches as the water dam 89 repeatedly forms and collapses allowing pockets of air to intermittently surge into the central opening of the second tubular member 76.

When the turbulence of air and water reach the back pressure ring 92, the restriction allows the surface tension of the water to coalesce or merge the air into large bubbles 96 with well formed outer walls that thereafter move with a minimum amount of turbulence upward in the well 20. Accordingly, the water being pumped by the rising bubbles will have a minimum opportunity to strip oxygen from the water and a greater amount of oxygen in the water will be pumped into the surrounding ground thereby increasing the oxygenation of the water.

While the present invention has been described with respect to a single embodiment, it will be appreciated that many modifications may be made without departing from the spirit and scope of the invention. It is therefore the intent of the appended claims to cover all such modifications and variations that fall within the spirit and scope of the invention.

What is claimed:

1. A device for oxygenating ground water comprising
a length of tubing having an open upper end, an open lower end, a tubular wall extending from said upper end to said lower end, a longitudinal axis and an inner diameter,
a plurality of parallel electrically conductive plates within said tubular wall,
alternate ones of said electrically conductive plates connectable to positive and negative terminals of a source of electric power wherein adjacent ones of said electrically conductive plates bear opposite charges,
a second length of tubing having an outer diameter less than said inner diameter of said length of tubing and a longitudinal axis parallel to said longitudinal axis of said length of tubing, an upper end, an inner diameter, and an outer surface,
said second length of tubing fitted within said length of tubing and above said plurality of electrically conductive plates wherein a cavity is formed between said outer surface of said second length of tubing and said length of tubing, a port connectable to a source of compressed air wherein compressed air is admissible into said cavity, and said second length of tubing having an open lower end wherein air in said cavity enters said lower end from around a circumference of said second length of tubing.

2. The device of claim 1 and further comprising a mixing chamber above said electrically conductive plates and below said lower end wherein oxygen in said water is uniformly blended.

3. The device of claim 1 and further comprising an end plate between an upper end of said second length of tubing and said length of tubing, said end plate forming an upper end of said chamber surrounding said second length of tubing.

4. The device of claim 1 and further comprising a restriction in an inner opening of said second length of tubing near said upper end thereof.

5. The device of claim 4 and further comprising an end plate between an upper end of said second length of tubing and said length of tubing forming an upper end of said chamber surrounding said second length of tubing, and a mixing chamber above said electrically conductive plates and below said lower end wherein oxygen in said water is uniformly blended.

6. A device for oxygenating ground water comprising a length of tubing having an open upper end, an open lower end, a tubular wall extending from said upper end to said lower end, a longitudinal axis and an inner diameter, a plurality of parallel electrically conductive plates within said tubular wall, alternate ones of said electrically conductive plates connectable to positive and negative terminals of a source of electric power wherein adjacent ones of said electrically conductive plates bear opposite charges, a pump for moving water through said tubing from said lower end of said upper end, a second length of tubing having an outer diameter less than said inner diameter of said length of tubing and a longitudinal axis parallel to said longitudinal axis of said length of tubing, an upper end, a lower end, and an inner diameter, said second length of tubing fitted within said length of tubing and above said plurality of electrically conductive plates, a port near said lower end, said port connectable to a source of compressed air, and said upper end of said second length of tubing having a constriction therein having an inner diameter less than said inner diameter of said second length of tubing.

7. The device of claim 6 and further comprising a mixing chamber above said electrically conductive plates and below said lower end wherein oxygen in said water is uniformly blended.

8. The device of claim 6 and further comprising an end plate between an upper end of said second length of tubing and said length of tubing, said end plate forming an upper end of a chamber between said outer surface of said second length of tubing and said inner surface of said length of tubing.

9. The device of claim 6 wherein a cavity is formed between said outer surface of said second length of tubing and said length of tubing and said port admits compressed air into said cavity, and said lower end is open wherein air in said cavity enters said lower end from around a circumference of said second length of tubing.

10. The device of claim 6 and further comprising an end plate between an upper end of said second length of tubing and said length of tubing wherein a cavity is formed between said outer surface of said second length of tubing and said length of tubing and said port admits compressed air into said cavity, said lower end is open wherein air in said cavity enters said lower end from around a circumference of said second length of tubing, and a mixing chamber above said electrically conductive plates and below said lower end wherein oxygen in said water is uniformly blended.

11. The device of claim 10 and further comprising a third length of tubing having an inner diameter equal to said inner diameter of said second length of tubing, said third length of tubing positioned within said first length of tubing and axially below said second length of tubing and above said mixing chamber.

\* \* \* \* \*